No. 620,893. Patented Mar. 14, 1899.
J. W. DICKINSON.
DEVICE FOR DRIVING EMERY WHEELS.
(Application filed May 14, 1898.)
(No Model.)
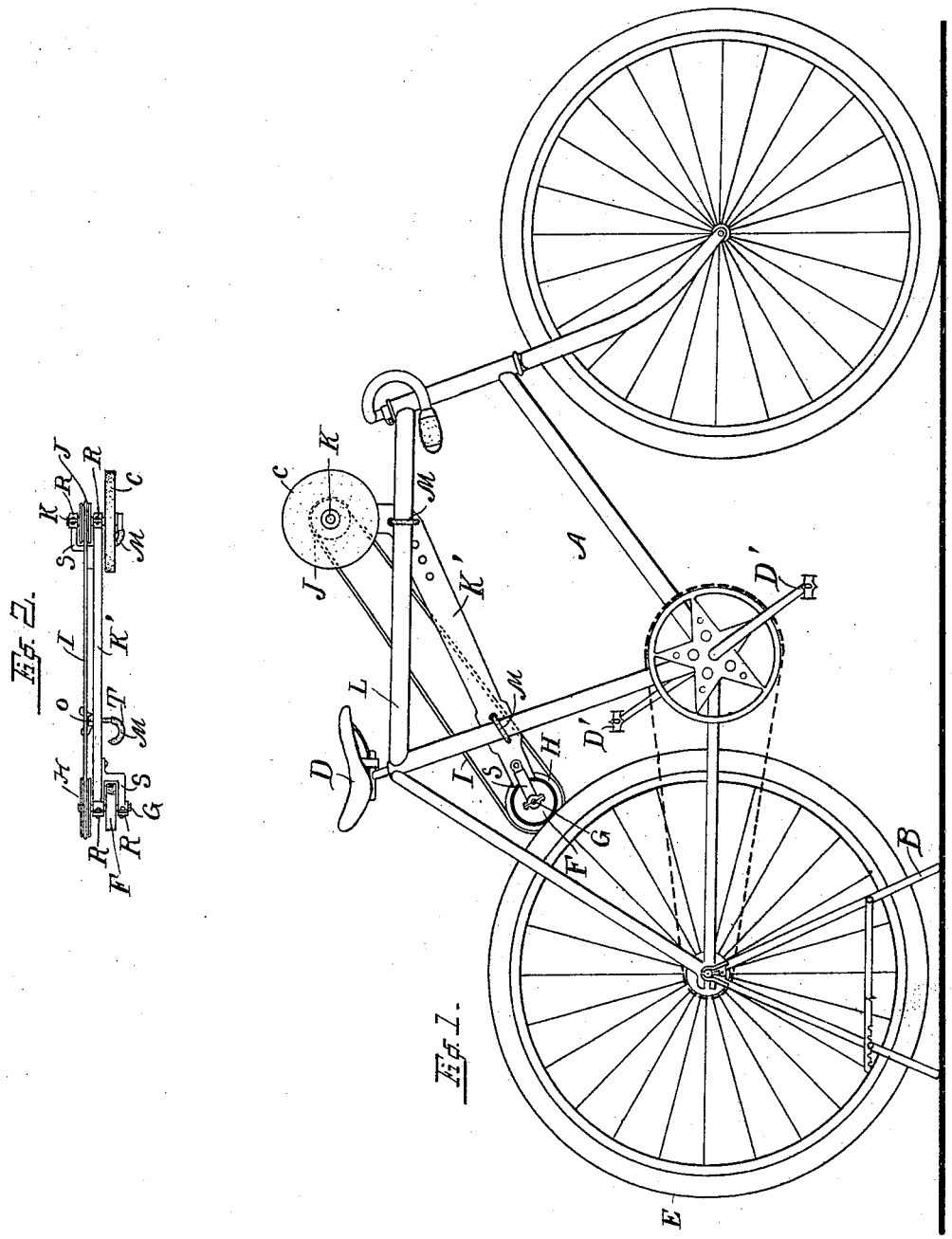
Witnesses.
Inventor.
James W. Dickinson
By Erwin Wheeler & Wheeler
Attorneys.

UNITED STATES PATENT OFFICE.

JAMES W. DICKINSON, OF MILWAUKEE, WISCONSIN.

DEVICE FOR DRIVING EMERY-WHEELS.

SPECIFICATION forming part of Letters Patent No. 620,893, dated March 14, 1899.

Application filed May 14, 1898. Serial No. 680,661. (No model.)

*To all whom it may concern:*

Be it known that I, JAMES W. DICKINSON, a citizen of the United States, residing at Milwaukee, in the county of Milwaukee and State of Wisconsin, have invented new and useful Improvements in Grinding Attachments for Bicycles, of which the following is a specification.

The object of my invention is to utilize the driving mechanism of an ordinary bicycle for driving an emery-wheel, and its construction is explained by reference to the accompanying drawings, in which—

Figure 1 represents a side view of a bicycle to which my device is attached. Fig. 2 is a top view of my emery-wheel and driving mechanism, which are operated by the driving-wheel of the bicycle.

Like parts are referred to by the same reference-letters in both views.

The bicycle A and the bicycle frame or support B are both of the ordinary construction.

C represents the emery-wheel, which is supported in a convenient position to be used by the operator when sitting upon the saddle D while he operates the cranks D' D' with his feet and rotates the driving-wheel of the bicycle in the ordinary manner. Motion is communicated to the emery-wheel C from the bicycle driving-wheel E through the friction-pulley F, shaft G, primary band-pulley H, band I, secondary band-pulley J, and shaft K.

The relative size of the driving and driven band-pulleys to each other and the bicycle driving-wheel may of course be varied to produce the desired speed. While the band-pulleys and connecting mechanism may, if desired, be connected direct to the frame of the bicycle, they are preferably supported from the connecting-bar K', which bar is in turn secured to the frame L of the bicycle by the clamping-irons M. The clamping-irons M engage the frame L upon one side of the connecting-bar K' and are provided upon the opposite side of the bar with screw-threaded bearings and clamping-nuts O of ordinary construction, whereby it is obvious that by turning down said nuts against the connecting-bar the same is drawn firmly against the frame of the bicycle and held rigidly in place.

R R are journal-bearings by which the shafts G and K are supported. The journal-bearings R are in turn supported from the connecting-bar K' by brackets S S.

T T are rubber cushions which surround the ends of the clamping-irons where they engage the bicycle-frame and prevent the same from being marred by contact with the irons.

Preparatory to operating the emery-wheel the bicycle driving-wheel E is raised from contact with the ground and supported by the frame B, as shown in Fig. 1.

While my device is especially adapted to produce high speed for driving emery-wheels, it is obvious that the same may, if desired, be used for driving grindstones or for other similar purposes.

Having thus described my invention, what I claim as new, and desire to secure by Letters Patent, is—

In a grinding attachment for bicycles, the combination of a supporting-bar provided with journal-bearings at its ends; a shaft mounted in the bearings at one end of the bar, having a grinding-wheel and a belt-pulley mounted thereon; a shaft mounted in the bearings at the opposite end of the bar, provided with a belt-pulley and a friction-pulley mounted thereon; a belt connecting said belt-pulleys and clamps, whereby the bar may be attached to the frame of a bicycle with the friction-pulley in contact with one end of the wheels of the bicycle, all substantially as and for the purpose specified.

In testimony whereof I affix my signature in the presence of two witnesses.

JAMES W. DICKINSON.

Witnesses:
JAS. B. ERWIN,
LEVERETT C. WHEELER.